Feb. 14, 1939.  S. W. ROTHENBERGER ET AL  2,147,500
HYDROMETER ATTACHMENT FOR MOTOR PROPELLED VEHICLES
Filed May 24, 1937    2 Sheets-Sheet 1

INVENTORS
Simon W. Rothenberger
Walter E. Cornman
Dean A. Cornman
By their Attorneys
Merchant & Nixon Feb. 14, 1939. S. W. ROTHENBERGER ET AL 2,147,500
HYDROMETER ATTACHMENT FOR MOTOR PROPELLED VEHICLES
Filed May 24, 1937 2 Sheets-Sheet 2
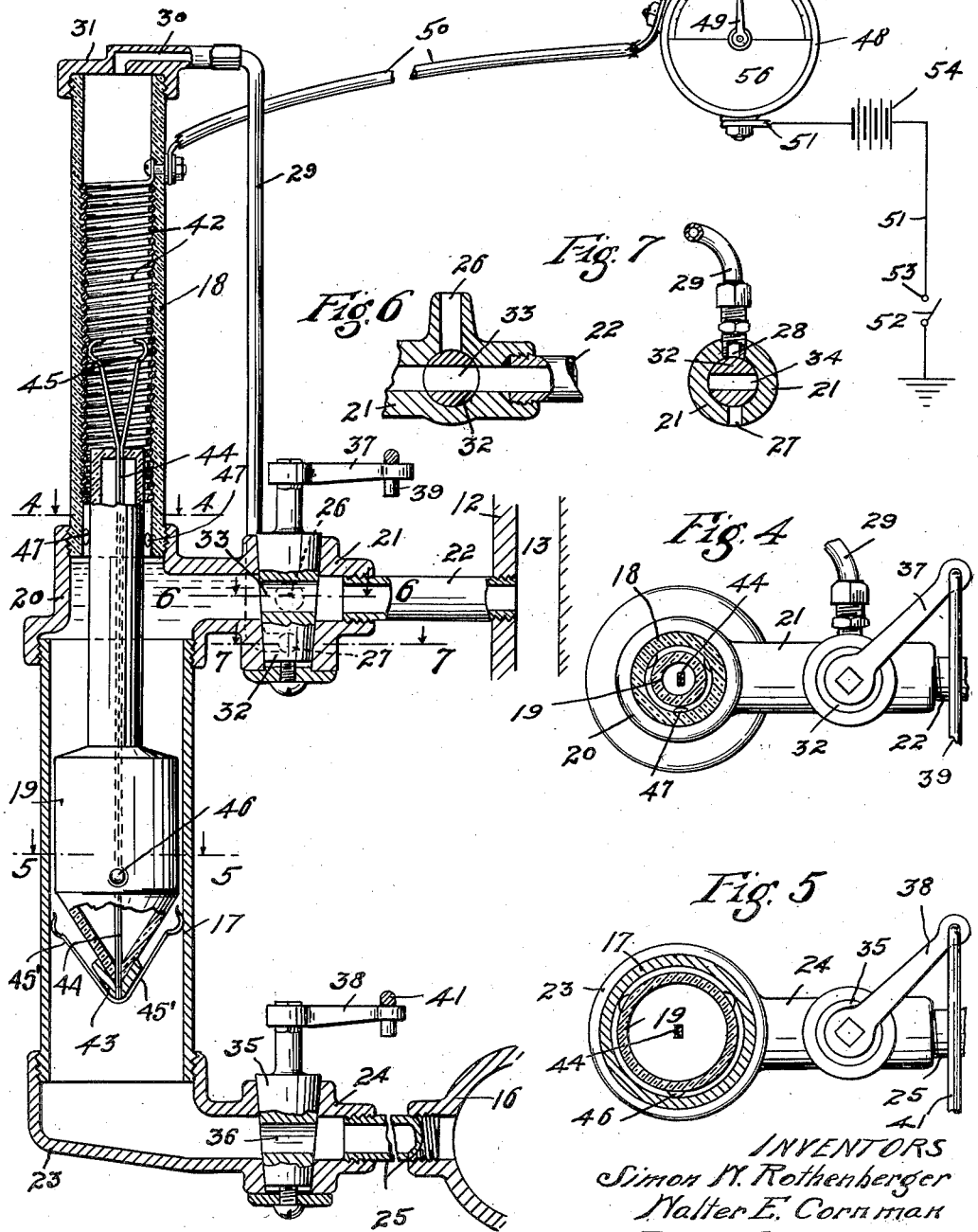
INVENTORS
Simon W. Rothenberger
Walter E. Cornman
Dean A. Cornman
By their Attorneys
Merchant Kregor Patented Feb. 14, 1939

2,147,500

UNITED STATES PATENT OFFICE 2,147,500

HYDROMETER ATTACHMENT FOR MOTOR PROPELLED VEHICLES

Simon W. Rothenberger, Walter E. Cornman, and Dean A. Cornman, Minneapolis, Minn.

Application May 24, 1937, Serial No. 144,372

7 Claims. (Cl. 265—45)

This invention relates to instruments for determining the specific gravity of liquids and hence the strength of the spirituous liquors, saline solutions, etc., and which instruments are known as hydrometers.

The invention involves an improved form of hydrometer connected in a novel way and in a novel association with the water circulating or cooling systems of the engines of motor-propelled vehicles.

Generally stated, the invention consists of the novel devices and combinations of devices hereinafter described and defined in the claims.

The hydrometer is attached as a permanent part of the cooling system of the engine and is available at all times to determine the specific gravity of the cooling liquid, and hence, the freezing point of such liquid.

One form of the invention is illustrated in the accompanying drawings wherein like characters indicate like parts throughout the several views.

Referring to the drawings:

Fig. 3 is a view, chiefly in vertical section with some parts broken away and some parts sectioned, showing the improved hydrometer and connections between the water jacket of the cylinder block and return pipe that leads from the radiator back to the water jacket;

Fig. 4 is a horizontal section taken on the line 4—4 of Fig. 3;

Fig. 5 is a horizontal section taken on the line 5—5 of Fig. 3;

Fig. 6 is a section taken on the line 6—6 of Fig. 3; and

Fig. 7 is a section taken on the line 7—7 of Fig. 3.

Figure 1:
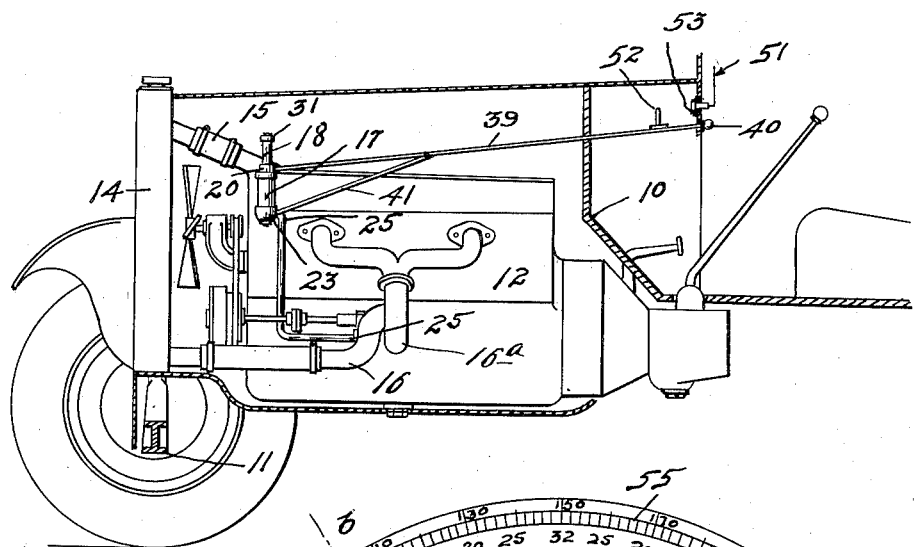
Fig. 1 is a side elevation, with some parts sectioned, showing the manner in which the hydrometer and associated parts are attached to the engine of an automobile or motor-propelled vehicle.

Of the parts of the automobile shown it is only desirable for the purpose of this case to particularly note the body 10 supported by the customary chasis 11; the engine block 12, having the customary water jacket 13, the radiator 14; the upper water circulating pipe 15 that connects the water jacket to the top of the radiator, and the return pipe 16 that connects the bottom of the radiator back to the water jacket, through pump 16a.

The hydrometer shown involves a lower portion in the form of a metallic tube 17, an upper portion 18 of insulating material, preferably glass, and a float or bulb 19. The elements 17 and 18 are connected by a metallic elbow 20 which, by screw-threaded engagements or otherwise, forms water-tight connections between the said elements 17 and 18. The elbow 20 is formed with a valve seat 21 that is connected by a short pipe 22 to the water jacket 13 of the engine block. The lower end of the metallic tube 17 is connected by a water-tight joint with an elbow 23 that is formed with a valve seat 24 that is connected by a short pipe 25 to the return pipe 16.

The valve seat 21 is provided with an upper drain port 26 and lower down with diametrically opposite ports 27 and 28, the latter of which, by a pipe 29, is connected to a port 30 in a cap 31 that closes the top of the glass tube 18.

Working in the valve seat 21 is an oscillatory valve 32 that has two diametric passages 33 and 34. The port 33 is at an angle of 90° to the port 34 but is above the same. Valve port 33 is adapted to open communication between the elbow 20 and pipe 22 when the valve is turned to the position shown in Fig. 3, at which time the valve will close the ports 27 and 28, as shown in Fig. 7.

In the valve seat 24 is an oscillatory valve 35 which has a diametric port 36. Valves 32 and 35 are provided, respectively, with projecting arms 37 and 38 that are connected for simultaneous movements so as to simultaneously move the valves 32 and 35 from open positions, shown in Fig. 3, into closed positions. As shown, this valve operating means is a rod 39 that extends through the instrument board and terminates in a knob or hand-piece 40, combined with the link 41 that connects the arm 38 to said rod 39, as best shown in Fig. 1.

Secured to the inner surface of the glass or insulating tube 18 is a rheostat coil 42. At its extreme lower end the bulb 19 is provided with a metallic tip 43 and extending axially through the bulb 19 and its stem and the metallic tip 43 is a metallic conductor shown as formed by two light metallic bars 44, the upper ends of which terminate in spring prongs 45, the ends of which are curved for light electrical contact with the interior of the rheostat coil 42. The lower ends of the bars 44 also terminate in spring prongs 45′, the ends of which are curved for light electrical contact with the interior surface of the tube 17.

Here it should be noted that the bulb 19 is provided with circumferentially spaced outstanding rounded bosses 46 that directly contact with the interior of the metallic tube or casing 17. Also it will be noted that the glass tube 18, near its lower end, is provided with inwardly projecting rounded bosses 47 that lightly engage the stem of the bulb. These bosses keep the bulb or float centered and its main walls also out of contact with the interior walls of the container.

In the instrument illustrated the indicating instrument is connected in series with the rheostat and, hence, the instrument is an ammeter. This instrument is of the well known type wherein, under electro-magnetic action, a pointer is moved over a dial and is variably positioned in accordance with the current flow. The instrument, is contained within a casing 48, and comprises a pointer or arm 49 which, as stated, will be variably positioned according to current flow. The interior mechanism of the ammeter is connected between lead wires 50 and 51. Wire 50 is connected to the upper terminal of the rheostat coil 42. Lead wire 51 is grounded through the metallic parts of the machine and, hence, will be electrically connected through the forked contact 44 to the intermediate portion of the rheostat coil 42 and the metllic tube 17, when a switch 52—53 is closed. The switch is preferably applied so that it will be closed when the valve-actuating rod 39 is pulled rearward; and, as shown in Fig.1, one of the contacts is secured on but insulated from the rod 39, while the other contact 43 is secured on and insulated from the instrument board. The source of energy illustrated is a battery 54 interposed in the lead 51. This source, however, may be and preferably is the battery of the automobile when the instrument is applied to such vehicle.

Figure 2:
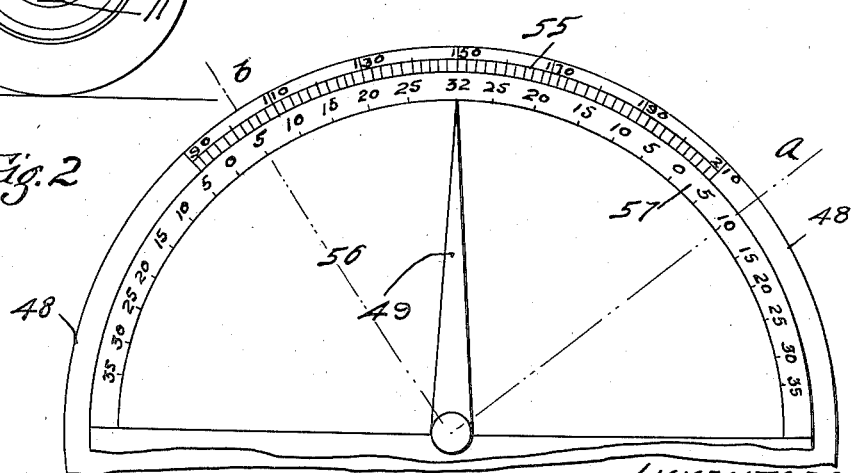
Fig. 2 is an elevation, with some parts broken away, showing the dial and pointer of the instrument which, under the action of the hydrometer, indicates the freezing point or temperature of the cooling liquid.

In Fig. 2 the casing, ammeter and an associated dial are indicated on a much larger scale than in Fig. 3. On the casing 48 is a fixed scale 55 graduated to indicate degrees of temperature. Axially pivoted to the casing 48 is an indicator dial 56. The scale 57 is marked at its central portion with the numeral 32 which indicates 32° Fahrenheit. From the numeral 32 toward the right the scale 57 is graduated to indicate in degrees of Fahrenheit the freezing point of liquids that are heavier than water, and in this instance it is graduated to indicate the freezing points of water containing a commercial liquid known in the trade as Prestone, and which liquid, commingled with water, is heavier than pure water. From the numeral 32 toward the left the scale 57 is graduated to indicate the freezing points of water containing alcohol, and which mixtures are lighter than water.

Here it should be stated that when pure water is contained in the container the float will assume an intermediate position, substantially as shown in Fig. 3; when the liquid in the container is heavier than water the float will rise above the position shown in Fig. 3 to an extent depending on the amount of heavy liquid, assumed to be Prestone, contained in the water; and when the water in the container contains an alcohol the float will lower, depending on the amount of alcohol in the solution. When the float is in the position shown in Fig. 3 and the circuit is closed through the ammeter, its finger or arm 49 will stand in vertical position, shown in Fig. 3. When the float is raised above the position shown in Fig. 3, a greater amount of current will flow through the instrument and the finger 49 will move toward the right, the position depending on the increasing specific gravity of the liquid.

When, however, the float lowers, the resistance through the circuit will be increased and the finger 49 will move toward the right, the positions increasing with the increased amount of alcohol in the water.

From the foregoing statement it is evident that the various positions that the finger or arm 49 will assume will indicate the freezing resisting quality of the liquid and may be translated into the degrees that the liquid will freeze by reading of the position of the pointer on the scale 57. To enable this indicator to be correctly read on the scale the operator should first observe the temperature of the water as indicated by the temperature indicator of the automobile. If the temperature of this water is found to be 150°, for example, then the dial 56 is turned until the 32 mark registers with the mark 150 on the fixed scale 55. This being done and the switch being closed by pulling rearward on the rod 39, the finger 49 will be moved in one direction or the other. If the solution contains a relatively heavy liquid such as Prestone and the finger 49 moves to the position indicated by the dotted line $a$ on Fig. 2, the pointer will then align with the dial marking 10, indicating that the freezing point of the liquid tested is ten below zero. If, on the other hand, the solution contains a lighter substance such as alcohol, the pointer will then move toward the left, and if it moves to the position indicated by the dotted line $b$ on Fig. 2, the pointer will then align with the numeral 5, which indicates five degrees above zero as the freezing point of the liquid tested.

Correct testing of the liquid also requires that the level of the liquid in the container at the time of measurement be always at a constant or predetermined level. This will be automatically accomplished whenever the rod 39 is pulled rearward, as above stated, to close switch 52—53. This rearward movement of the rod simultaneously moves the valves 32 and 35 to positions 90° from the positions shown in Fig. 3, thereby cutting off the container from the circulating connections of the automobile or vehicle. The above noted movement also causes valve 32 to perform two additional functions, to wit: It opens the drain port 26 and opens the air vent pipe 29 to the atmosphere, thereby insuring the predetermined desired level of the liquid in the container. Each time the drain port 26 is opened, the liquid in the container will be brought to a predetermined level, resulting in the loss of a few drops of said liquid each time a test is made.

With the testing instrument described the testing of the freezing point of the cooling liquid may be made, if desired, while the engine is operating or even while the car is travelling.

In the drawings I have illustrated a dial scale for indicating the freezing points of liquids that are heavier than, as well as lighter than, pure water, but it will be understood that the number of scales could be increased to represent various other anti-freeze or low freezing mixtures. It is further evident that various modifications and applications of the device may be made within the scope of the invention herein disclosed and claimed.

What we claim is:

1. In an instrument of the kind described, a liquid container having means for connecting the same in a liquid-circulating system, whereby said liquid will normally flow through the container, a hydrometer in the container, means operable, at will, for cutting off the flow of liquid through the container during the reading of the hydrometer, a normally closed drain leading from the container, and means operable, at will, for opening the drain, when the flow of liquid through the container is stopped, to drain the liquid in the container to a predeterminel level.

2. The structure defined in claim 1 which further includes a normally closed air vent leading from the container and holding air caged in the container to limit the rise of liquid in the container, and means for opening the air vent when the flow of liquid through the container is stopped to release the air pressure in the container.

3. In an instrument of the kind described, a liquid container having means for connecting the same in a liquid-circulating system, whereby said liquid will normally flow through the container, a hydrometer in the container, a normally closed air vent leading from the container and holding air caged in the container to limit the rise of liquid in the container, a normally closed drain leading from the container, and common means operable, at will for cutting off the flow of liquid through the container, during the reading of the hydrometer, and for opening the air vent and the drain to release the air pressure in the container and drain the liquid in the container to a predetermined level.

4. In an instrument of the kind described, a tube-like container having means for connecting the same in a liquid-circulating system whereby the liquid will normally flow through the lower section of the container, a hydrometer in the container, means operable, at will, for cutting off the flow of liquid through the container, during the reading of the hydrometer, a rheostat including a fixed element and a movable element, the former of which is in the upper section of the container and the latter of which is carried by the hydrometer, a normally closed air vent leading from the container and holding air caged in the upper section of the container to prevent the liquid from coming in contact with the fixed element of the rheostat, said movable rheostat being in contact with the fixed rheostat element and the liquid, a normally closed drain leading from the container and through which drain, when open, the liquid in the container will be drained to a predetermined level, means for opening the air vent and the drain when the flow of liquid through the container is stopped, and an electric circuit of which the rheostat forms a part.

5. The structure defined in claim 4 in which the hydrometer is non-metallic, and in which the movable rheostat element extends axially through the hydrometer with its upper end portion contacting the fixed rheostat element and its lower end portion extending into the liquid, the lower section of the container being a conductor of electricity and the upper section thereof being a non-conductor of electricity.

6. The structure defined in claim 4 in which the hydrometer is non-metallic, and in which the movable rheostat element extends axially through the hydrometer with its upper end portion contacting the fixed rheostat element and its lower end portion extending into the liquid, the lower section of the container being a conductor of electricity and the upper section thereof being a non-conductor of electricity and in which the fixed rheostat element is a coil held on the internal wall of the upper section of the container.

7. In an instrument of the kind described, a liquid container having means for connecting the same in a liquid-circulating system, whereby said liquid will normally flow through the container, a hydrometer in the container, a normally closed drain through which, when open, the liquid in the container is drained to a predetermined level, a normally closed air vent leading from the container and holding air caged in the container to limit the rise of the liquid in the container, and valve mechanism normally set to permit a flow of liquid through the container and close the drain and air vent, when a reading of the hydrometer is to be taken, said valve mechanism is set in another position in which it cuts off the flow of liquid through the container and opens the drain and the air vent.

SIMON W. ROTHENBERGER.
WALTER E. CORNMAN.
DEAN A. CORNMAN.